(12) United States Patent
Takasaki

(10) Patent No.: US 10,225,433 B2
(45) Date of Patent: Mar. 5, 2019

(54) IMAGE PROCESSING APPARATUS

(71) Applicant: BROTHER KOGYO KABUSHIKI KAISHA, Nagoya-shi, Aichi-ken (JP)

(72) Inventor: Hironori Takasaki, Oogaki (JP)

(73) Assignee: BROTHER KOGYO KABUSHIKI KAISHA, Nagoha-Shi, Aichi-Ken (JP)

( * ) Notice: Subject to any disclaimer, the term of this patent is extended or adjusted under 35 U.S.C. 154(b) by 0 days.

(21) Appl. No.: 15/844,937

(22) Filed: Dec. 18, 2017

(65) Prior Publication Data
US 2018/0176412 A1    Jun. 21, 2018

(30) Foreign Application Priority Data

Dec. 21, 2016    (JP) .................. 2016-247582

(51) Int. Cl.
*G06F 3/12*    (2006.01)
*H04N 1/32*    (2006.01)
*H04N 1/00*    (2006.01)

(52) U.S. Cl.
CPC ..... *H04N 1/32651* (2013.01); *H04N 1/00244* (2013.01); *H04N 1/00973* (2013.01); *H04N 1/32625* (2013.01); *H04N 2201/0094* (2013.01)

(58) Field of Classification Search
CPC .......... H04N 1/32651; H04N 1/00244; H04N 1/00973; H04N 1/32625; H04N 2201/0094
See application file for complete search history.

(56) References Cited

U.S. PATENT DOCUMENTS

2011/0242592 A1* 10/2011 Tamura ............ H04N 1/00204
358/1.15
2012/0113468 A1*  5/2012 Urakawa ................ G06F 9/452
358/1.15

FOREIGN PATENT DOCUMENTS

JP    2004-110172 A    4/2008
JP    2012-113700 A    6/2012

* cited by examiner

*Primary Examiner* — Moustapha Diaby
(74) *Attorney, Agent, or Firm* — Merchant & Gould P.C.

(57) ABSTRACT

An image processing apparatus includes: a memory; and a controller configured to execute: first acquisition processing of acquiring instruction data, execution instruction processing of causing an image processing device to execute the image processing action instructed by the instruction data, and first determination processing, in response that an error occurs during the image processing action, of determining whether the instruction data is specific instruction data or not, first error processing, in response that it is determined that the instruction data is not the specific instruction data, of displaying a standard error screen to be represented by standard screen data stored in advance in the memory, and second error processing, in response that it is determined that the instruction data is the specific instruction data, of displaying a custom error screen to be represented by custom screen data acquired from the server.

12 Claims, 12 Drawing Sheets

| SERVICE NAME | URL |
|---|---|
| DOWNLOAD PRINT | http://www.server-a.com/download-print1.xml |
| SCAN UPLOAD | http://www.server-a.com/scan-upload1.xml |
| SCAN USB | http://www.server-a.com/scan-usb1.xml |

| REPLACEMENT SYMBOL | SETTING INFORMATION |
|---|---|
| %PHONE-NO% | xxx-yyyy-zzzz |

| ERROR NOTIFICATION DESTINATION | file://server-b/print-error.xml |
|---|---|

FIG. 3A

<download-print1. xml>

```
<screen>
   <NextURL> http://www.server-a.com/download-print2.xml</NextURL>
   <title>data selection screen</title>
   <list key="dataID">
      <option>operation manual.pdf</option>
      <option>operation report.doc</option>
   </list>
</screen>
```

FIG. 3B

<download-print2. xml>

```
<screen>
   <NextURL> http://www.server-a.com/download-print3.xml</NextURL>
   <title>image quality selection screen</title>
   <list key="resolution">
      <option>fine</option>
      <option>normal</option>
   </list>
</screen>
```

FIG. 3C

<download-print3. xml>

```
<command>
   <download print>
      <data>http: //www.server-a.com/operation manual.pdf</data>
      01
      <image quality>normal</image quality>
   </download print>
   <ErrorURL> http://www.server-a.com/print-error.xml</ErrorURL>
</command>
```

FIG. 3D

<download-print4. xml>

```
<command>
   <download print>
      <data>http: //www.server-a.com/operation manual.pdf</data>
      04
      <image quality>normal</image quality>
   </download print>
   <ErrorURL> http://www.server-a.com/print-error.xml</ErrorURL>
</command>
```

FIG. 4A

<error01.xml>

```
<screen>
   <NextURL> http://www.server-a.com/download-print4.xml</NextURL>
   <error ID>sheet jamming</error ID>
   <generation method>image add</generation method>
   <image>http: //www.server-a.com/sheet-jam.mov</image>
   </message>
</screen>
```

FIG. 4B

<error02.xml>

```
<screen>
   <NextURL> http://www.server-a.com/download-print4.xml</NextURL>
   <error ID>sheet empty</error ID>
   <generation method>replace</generation method>
   <message language="Japanese">
      Please set paper in a tray.
   </message>
   <message language="English">
      Please set paper in a tray.
   </message>
</screen>
```

FIG. 4C

<error03.xml>

```
<screen>
   <NextURL> http://www.server-a.com/download-print4.xml</NextURL>
   <error ID>no toner</error ID>
   <generation method>message add</generation method>
   <message>point of contact: [%PHONE-NO%]</message>
</screen>
```

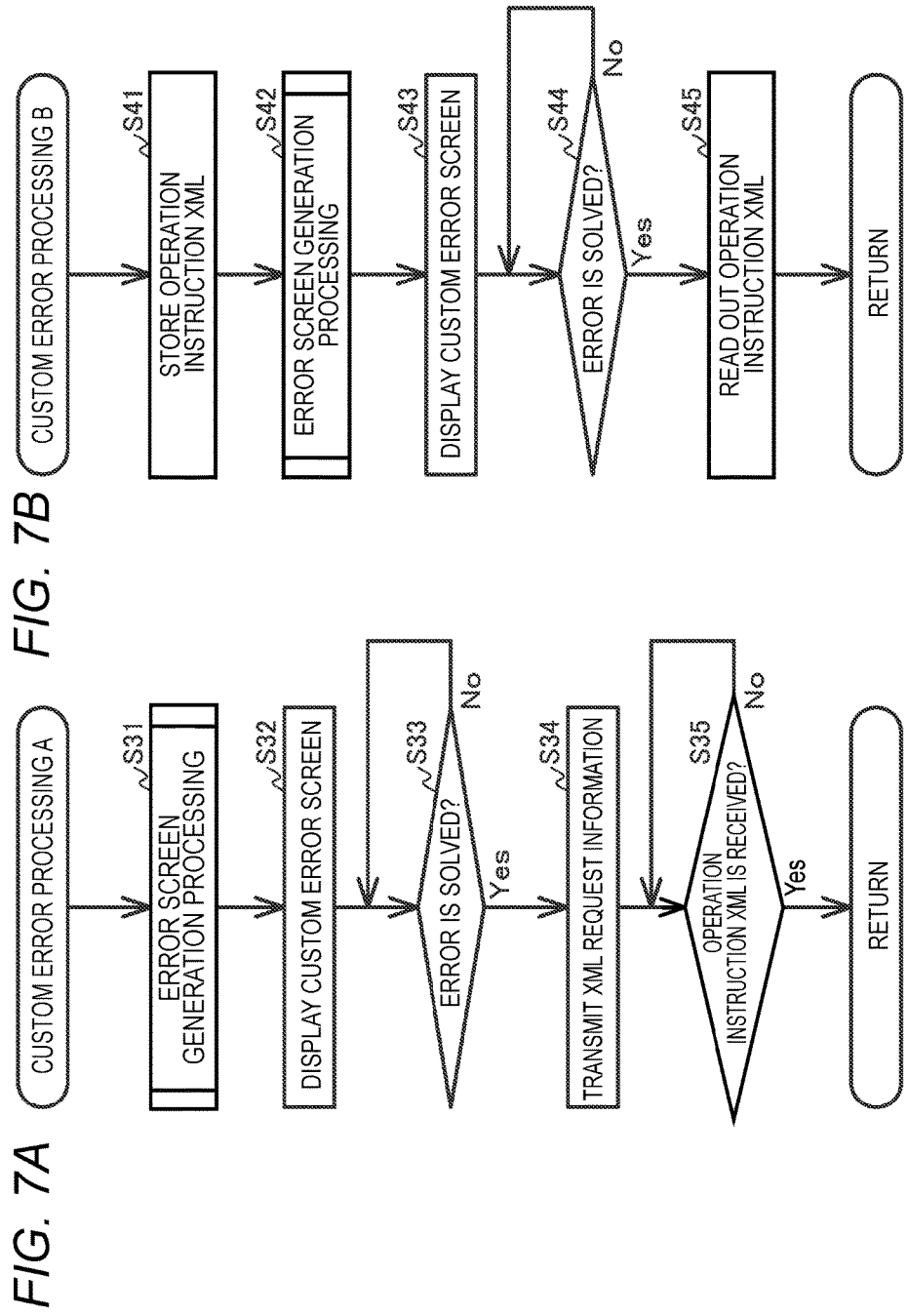

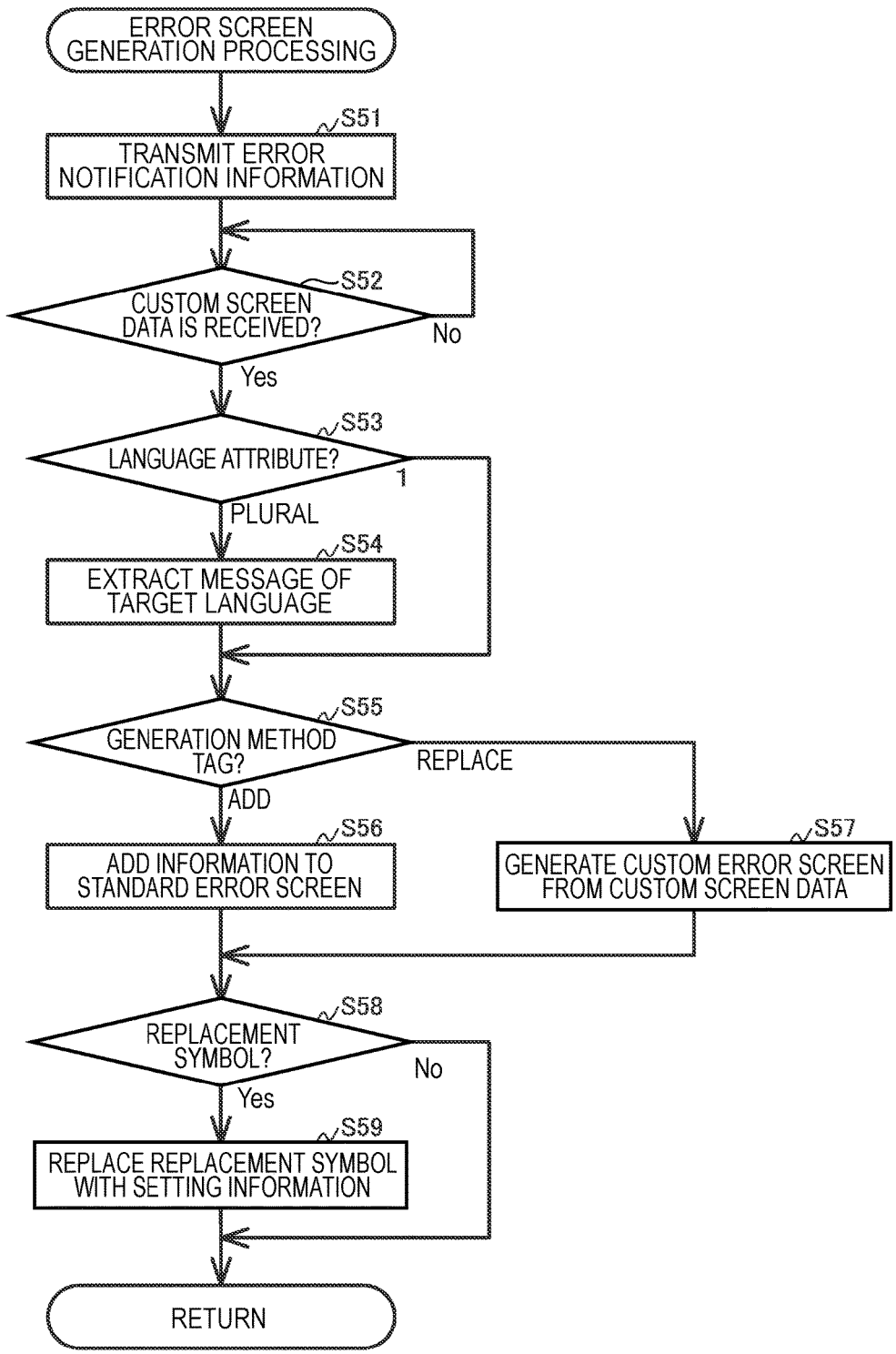

(Below message will be written in Japanese in the actual apparatus)

IMAGE PROCESSING APPARATUS

CROSS-REFERENCE TO RELATED APPLICATION

This application claims priority from Japanese Patent Application No. 2016-247582 filed on Dec. 21, 2016, the entire subject matter of which is incorporated herein by reference.

TECHNICAL FIELD

The disclosure relates to an image processing apparatus configured to execute an instructed image processing action.

BACKGROUND

For example, JP2012-113700A discloses a terminal apparatus configured to repeat processing of receiving instruction data from a server and executing an operation instructed by the received instruction data. The terminal apparatus can use a service (for example, upload or download of a file), which is provided by the server, by repeating the processing.

SUMMARY

The terminal apparatus disclosed in JP2012-113700A can implement a variety of services, which are provided by the server, in addition to operations mounted therein upon manufacturing thereof. In the meantime, there is a possibility that when an error occurs during using of the service, which is provided by the server, a content of the error may not be sufficiently notified by a standard error screen preset in the terminal apparatus.

The disclosure provides an image processing apparatus capable of notifying a content of an error, which occurs during an image processing action, through an appropriate error screen corresponding to an acquisition source of instruction data.

In the specification, a variety of disclosures are provided. One of the disclosed examples is an image processing apparatus including am image processing device configured to execute an image processing action; a communication interface; a memory; a display, and a controller. The controller is configured to execute: first acquisition processing of acquiring instruction data, execution instruction processing of causing the image processing device to execute the image processing action instructed by the instruction data acquired in the first acquisition processing, and first determination processing, in response that an error occurs during the image processing action executed in the execution instruction processing, of determining whether the instruction data acquired in the first acquisition processing is specific instruction data or not. The specific instruction data is data received from a server, as a response to transmission request information transmitted to the server through the communication interface. The controller executes first error processing, in response that it is determined in the first determination processing that the instruction data is not the specific instruction data, of displaying a standard error screen for notifying the error of the image processing action, on the display. The standard error screen is a screen to be represented by standard screen data stored in advance in the memory. The controller executes second error processing, in response that it is determined in the first determination processing that the instruction data is the specific instruction data, of displaying a custom error screen for notifying the error of the image processing action, on the display. The custom error screen is a screen to be represented by custom screen data acquired from the server.

According to the above configuration, since an acquisition source of the screen data is changed in correspondence to an acquisition source of the instruction data, it is possible to notify a content of the error having occurred during the image processing action, through an appropriate error screen.

More specifically, when an error occurs in the image processing action executed in accordance with the specific instruction data acquired from the server, the custom screen data is acquired from the server, so that it is possible to display a customized error screen in conformity to a content of a service that is to be provided by the server. In the meantime, the server may be one or a set of servers.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 3A, 3B, 3C and 3D illustrate examples of a set of instruction data for implementing a download print service;

FIGS. 4A and 4B illustrate examples of custom screen data, FIG. 4A corresponds an error ID "sheet jamming", FIG. 4B corresponds to an error ID "sheet empty", and FIG. 4C corresponds to an error ID "no toner";

FIGS. 7A and 7B are a flowchart of custom error processing, FIG. 7A illustrates custom error processing A, and FIG. 7B illustrates custom error processing B;

FIG. 8 is a flowchart of error screen generation processing;

FIG. 9A illustrates a data selection screen, and FIG. 9B illustrates an image quality selection screen;

FIG. 10A illustrates a standard error screen, and FIG. 10B illustrates a custom error screen;

FIG. 12A illustrates a standard error screen, and FIG. 12B illustrates a custom error screen.

DETAILED DESCRIPTION

Hereinafter, an illustrative embodiment of the disclosure will be described with reference to the drawings. Meanwhile, the illustrative embodiment described in the below is just an example of the disclosure and can be appropriately changed without departing from the gist of the disclosure. For example, an execution sequence of each processing to be described later can be appropriately changed without departing from the gist of the disclosure.

Figure 1:
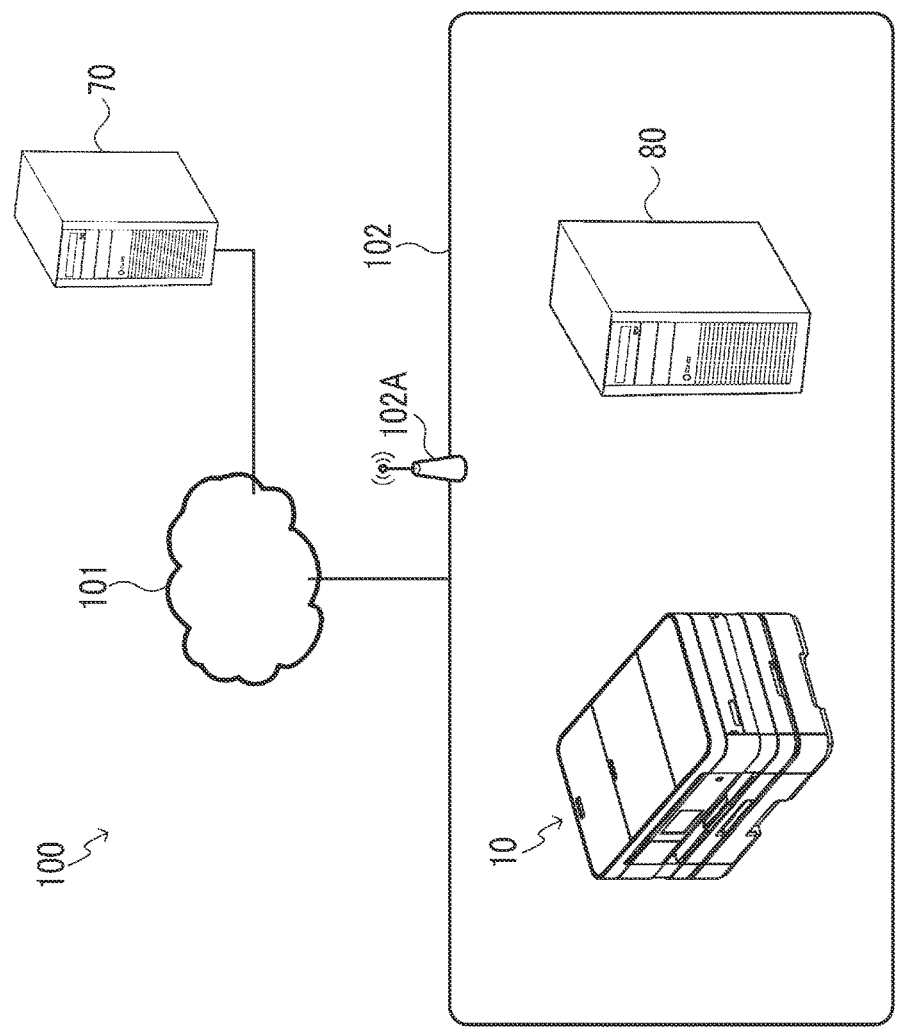
FIG. 1 illustrates an outline of a system 100 in accordance with an illustrative embodiment.

FIG. 1 is a schematic view of a system 100 in accordance with the illustrative embodiment. The system 100 shown in FIG. 1 includes an MFP 10 and servers 70, 80. Also, the system 100 may include a single function device of a printer or a single function device of a scanner, instead of the MFP 10, or may include a plurality of MFPs 10. The MFP 10 and the servers 70, 80 are configured to perform communication via a communication network. The communication network may be the Internet 101, a wired LAN, a wireless LAN 102 or a combination thereof, for example.

The MFP 10 and the server 80 belong to the wireless LAN 102. That is, the MFP 10 and the server 80 can perform communication with each other via an access point (not shown) of the wireless LAN 102. Also, the wireless LAN 102 is connected to the Internet 101 via a router 102A. Also, the server 70 is connected to the Internet 101. That is, the MFP 10 can perform communication with the server 70 from the router 102A via the Internet 101. However, connection destinations of the servers 70, 80 are not limited to the above example and any destination is possible inasmuch as it is possible to perform communication with the MFP 10.

The MFP 10 can use services, which are provided by the servers 70, 80, by executing operations instructed by each of a plurality of instruction data sequentially received from the servers 70, 80. In the below, a set of the plurality of instruction data for implementing the services that are provided by the servers 70, 80 may be denoted as "expansion program". The services that are provided by the servers 70, 80 include a scan upload service by which image data generated by a scanner 12 is to be uploaded to a storage server, a download print service by which a printer 11 is enabled to execute a print operation for image data downloaded from the storage server, and the like. In the meantime, the image data of the illustrative embodiment is not limited to a JPEG format, a TIFF format, a bitmap format and the like, and may also be a PDF format, a text format or the like.

Figures 2A, 2B, 2C, 2D:
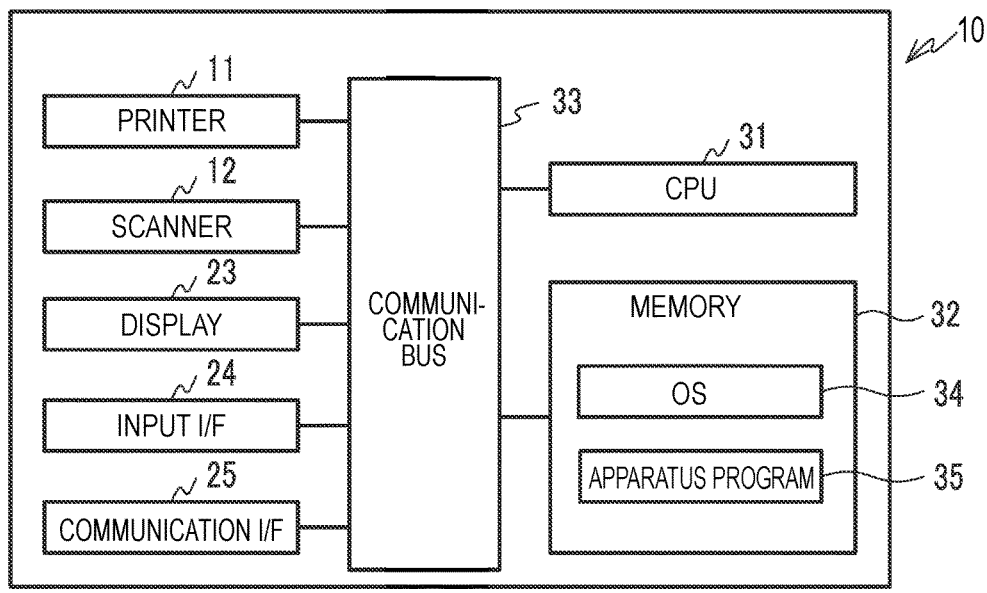
FIG. 2A is a block diagram of an MFP 10.
FIG. 2B illustrates a service list.
FIG. 2C illustrates a set of replacement symbol and setting information.
FIG. 2D illustrates address information of an error notification destination.
Figure 5:
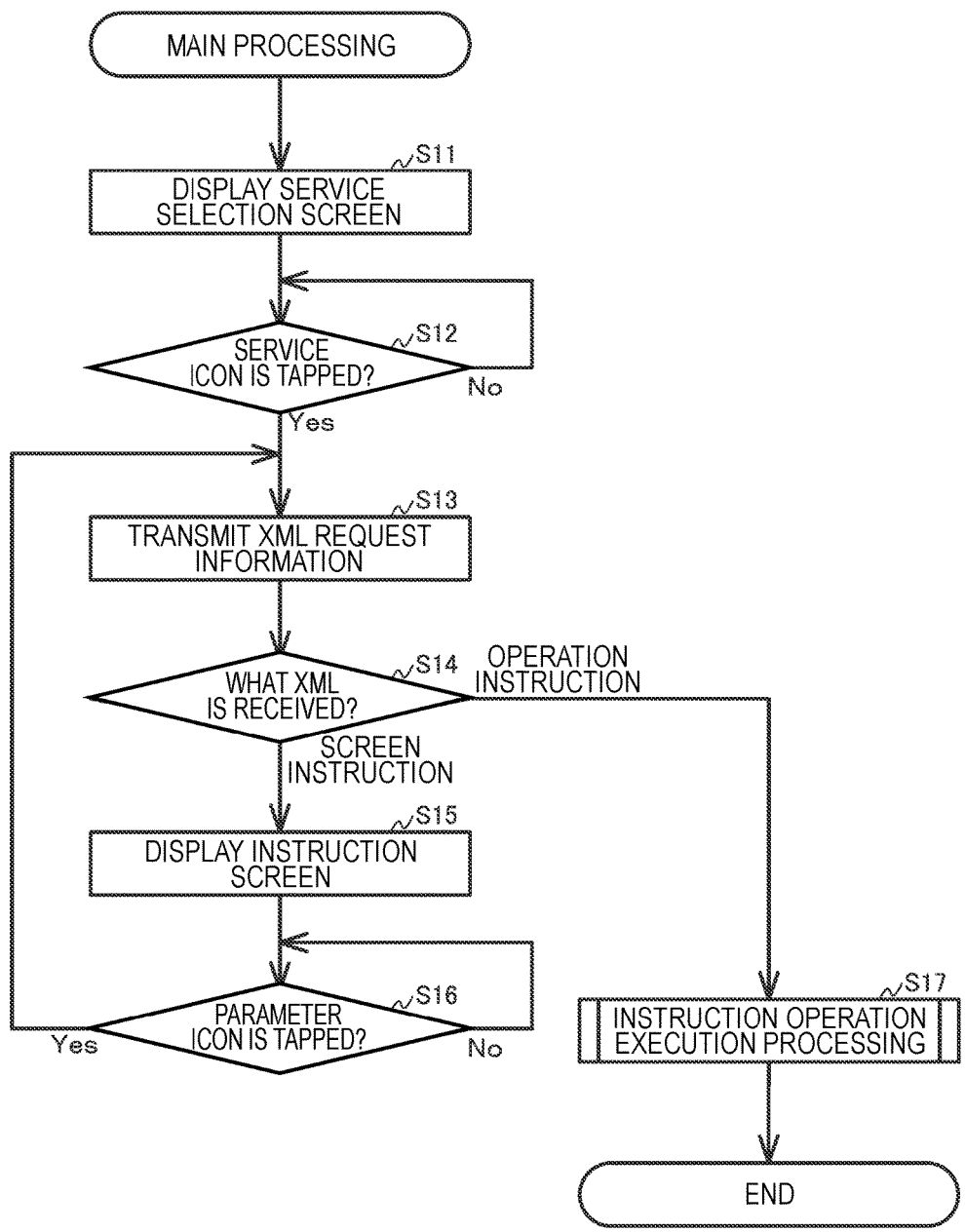
FIG. 5 is a flowchart of main processing.

As shown in FIG. 2A, the MFP 10 mainly includes a printer 11, a scanner 12, a display 23, an input I/F 24, a communication I/F 25, a CPU 31, a memory 32 and a communication bus 33. The respective constitutional elements configuring the MFP 10 are connected to each other via the communication bus 33. The MFP 10 is an example of the image processing apparatus. Also, the printer 11 and the scanner 12 are examples of the image processing device.

The printer 11 is configured to execute a print operation of recording an image represented by image data onto a sheet. As a recording method of the printer 11, a well-known method such as an inkjet method, an electrophotographic method and the like may be adopted. The scanner 12 is configured to execute a scan operation of reading an image recorded on a document and generating scan data. Also, the MFP 10 can execute a copy operation of causing the scanner 12 to execute the scan operation and causing the printer 11 to execute the print operation for the generated scan data. The print operation, the scan operation and the copy operation are examples of the image processing action for the image data.

Although not shown, the printer 11 mainly has a sheet feeding tray, conveyance rollers, and a recording unit. In the sheet feeding tray, a plurality of stacked sheet is placed. The recording unit is configured to record an image on a sheet by using toner accommodated in a toner cartridge. The conveyance rollers are configured to convey the sheets placed in the sheet feeding tray one by one to the recording unit through a conveyance path, and to discharge the sheet, on which the image has been recorded by the recording unit, to an outside of the printer 11 through the conveyance path.

The display 23 is a liquid crystal monitor, an organic EL display or the like and has a display screen for displaying a variety of information.

The input I/F 24 is a user interface configured to receive a user's input operation. Specifically, the input I/F 24 includes buttons and is configured to output a variety of operation signals associated with pushed buttons to the CPU 31. Also, the input I/F 24 may have a film-shaped touch sensor superimposed on the display screen of the display 23. An operation of designating an object displayed on the display screen of the display 23 and an operation of inputting a character string or a number string are examples of the user operation. The "object" includes a character string, an icon, a button, a link, a radio button, a check box, a pull-down menu and the like displayed on the display 23, for example.

The input I/F 24 implemented as the touch sensor is configured to output position information indicative of a position on the display screen touched by a user. Meanwhile, in the specification, the "touch" includes all operations of bringing an input medium into contact with the display screen. Also, even though an input medium is not in contact with the display screen, "hover" or "floating touch" of bringing the input medium close to a position at which a distance to the display screen is very small may be included the concept of "touch". Also, the input medium may be a user's finger, a touch pen or the like. A user's operation of tapping a position of an icon displayed on the display 23 is an example of a designation operation of designating the icon.

The communication I/F 25 is an example of the communication interface capable of performing communication with an external apparatus. The communication I/F 25 is configured to perform communication based on Wi-Fi (registered trademark) standards. The MFP 10 is configured to output a variety of information to the servers 70, 80 through the communication I/F 25 and to receive a variety of information from the servers 70, 80 through the communication I/F 25.

The CPU 31 is configured to control the entire operations of the MFP 10. The CPU 31 is configured to acquire and execute a variety of programs (which will be described later) from the memory 32, based on a variety of signals output from the input I/F 24, a variety of information acquired from an external apparatus through the communication I/F 25, and the like. That is, the CPU 31 and the memory 32 configure an example of the controller.

In the memory 32, an OS 34 and an apparatus program 35 are stored. In the meantime, the apparatus program 35 may be a single program or a collection of a plurality of programs. Also, in the memory 32, data or information necessary for execution of the apparatus program 35 is stored. The memory 32 is configured by a RAM, a ROM, an EEPROM, an HDD, a portable storage medium such as a USB memory to be detachably mounted to the MFP 10, a buffer provided for the CPU 31 or a combination thereof.

The memory 32 may be a computer-readable storage medium. The computer-readable storage medium is a non-transitory medium. The non-transitory medium includes a recording medium such as a CD-ROM, a DVD-ROM and the like, in addition to the above examples. Also, the non-transitory medium is a tangible medium. In the meantime, an electric signal for carrying a program to be downloaded from a server or the like on the Internet 101 is a computer-readable signal medium, which is one of the computer-readable media, but is not included in the non-transitory computer-readable storage medium.

The memory 32 can store therein a service list shown in FIG. 2B, for example. The service list includes one or more service records. The service record includes a service name and a URL. The service name is a character string indicative of a name of a service to be provided from the servers 70, 80. The URL is address information indicative of a location of instruction data, which is to be first acquired, of a plurality of instruction data implementing the service indicated by the service name.

Also, as shown in FIG. 2C, the memory 32 can associate and store therein a replacement symbol and setting information, for example. The replacement symbol is a symbol having a preset format that can be included in custom screen data (which will be described later). The setting information is information that is set with being associated with the replacement symbol by the user. For example, the setting information "xxx-yyyy-zzzz" associated with the replacement symbol [% PHONE-NO %] indicates contact information of a manager of the MFP 10. The memory 32 can store therein a plurality of sets of the replacement symbol and setting information.

Although not shown, the memory 32 can further store therein a plurality of standard screen data. The standard screen data is data, which represents a standard error screen for notifying an error when the error occurs during execution of an image processing action. That is, the memory 32 stores therein a plurality of standard screen data corresponding to types (for example, sheet jamming, sheet empty, no toner and the like) of errors that can occur. The standard screen data represents a standard error screen prepared by a developer of the MFP 10. That is, the standard screen data has been already stored in the memory 32 upon shipment of the MFP 10.

Figure 12A:
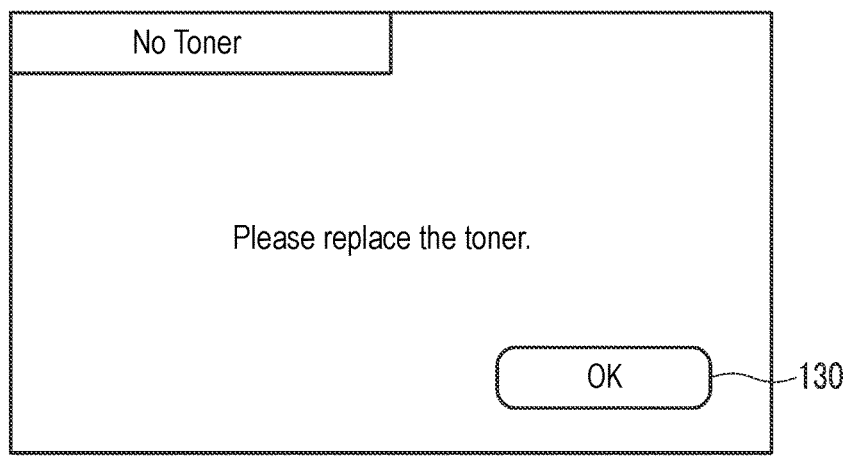
FIGS. 12A and 12B illustrate an error screen corresponding to the error ID "no toner"

As an example, standard screen data corresponding to an error (hereinafter, referred to as 'sheet jamming'), which indicates that a sheet is jammed on the conveyance path, represents a standard error screen shown in FIG. 10A. As another example, standard screen data corresponding to an error (hereinafter, referred to as 'no toner'), which indicates that there is no toner accommodated in a toner cartridge, represents a standard error screen shown in FIG. 12A. Although not shown, the memory 32 may further store therein standard screen data corresponding to an error (hereinafter, referred to as 'sheet empty'), which indicates that there is no sheet placed in the sheet feeding tray, and the like.

Figure 6:
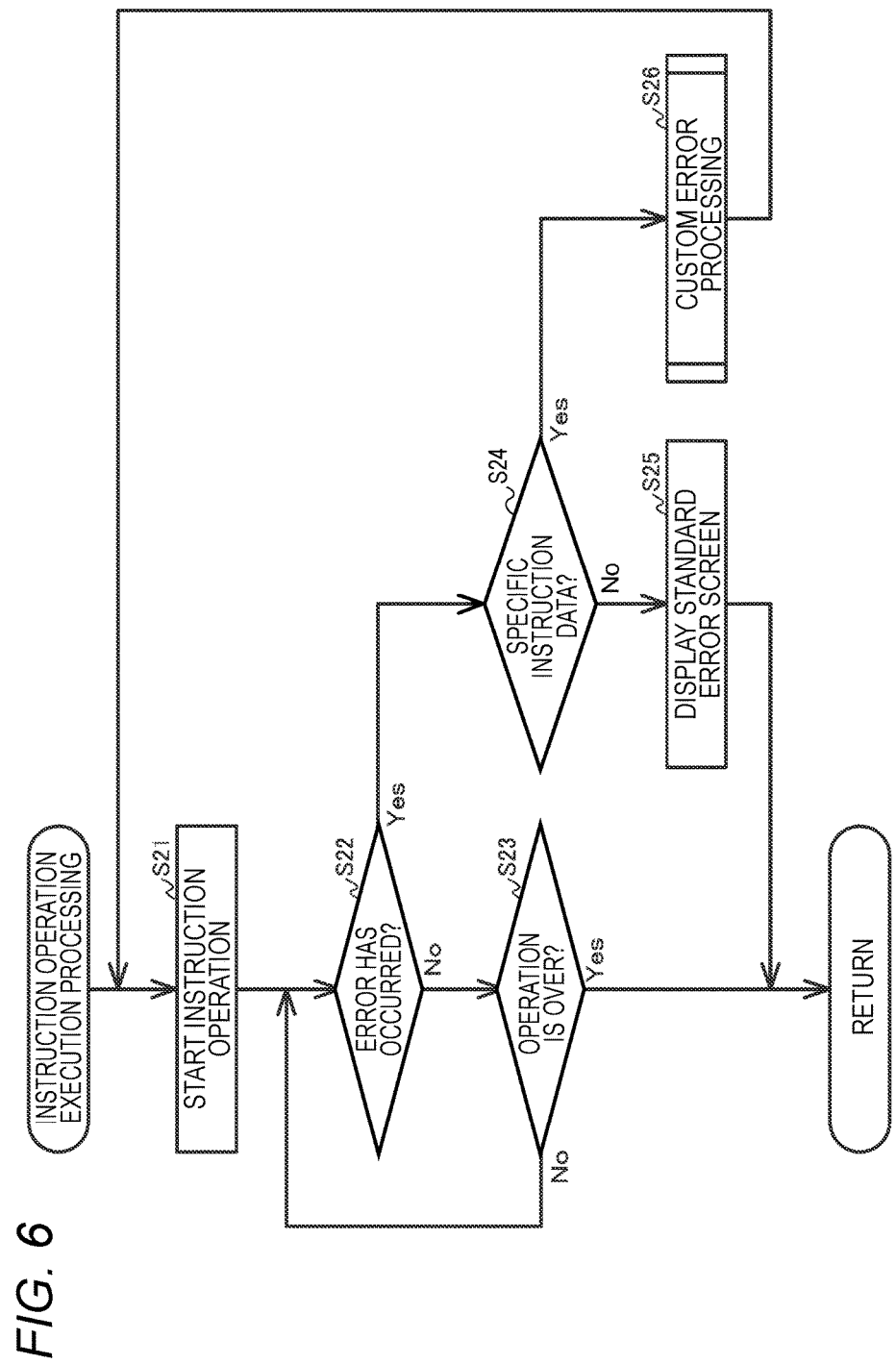
FIG. 6 is a flowchart of instruction operation execution processing.

The apparatus program 35 executes instruction operation execution processing shown in FIG. 6 in response that an execution instruction of the image processing action is received. As an example, the apparatus program 35 enables the printer 11 to execute the print operation in accordance with print instruction data in response that the print instruction data is received from an information processing apparatus (not shown) connected to the wireless LAN 102 (S21). As another example, in response that a [copy] button provided at the input I/F 24 is pushed, the apparatus program 35 enables the printer 11 and the scanner 12 to execute the copy operation in accordance with copy instruction data stored with being associated with the [copy] button in the memory 32. The print instruction data and the copy instruction data are examples of the instruction data for instructing execution of the image processing action. Also, the processing of acquiring the instruction data is an example of the first acquisition processing. Also, the processing of S21 is an example of the execution instruction processing.

Also, the printer 11 having received the instruction to execute the print operation enables the conveyance unit to convey the sheet placed in the sheet feeding tray, the recording unit to record an image on the sheet conveyed by the conveyance unit with, and the conveyance unit to discharge the sheet having the image thereon recorded by the recording unit to an outside of the printer 11. Here, in response that an error (for example, sheet jamming, sheet empty, no toner and the like) is detected during the print operation, the printer 11 notifies the error to the apparatus program 35. The printer 11 further has a well-known sensor configured to detect the error.

In response that the error is notified from the printer 11 (S22: Yes), the apparatus program 35 determines whether the error has occurred during the image processing action, which has been executed in accordance with the instruction data (hereinafter, referred to as 'specific instruction data') received from the servers 70, 80 (S24). In response that it is determined that the error has not occurred during the image processing action executed in accordance with the specific instruction data (S24: No), the apparatus program 35 displays a standard error screen, which is represented by the standard screen data corresponding to the notified error of the standard screen data stored in the memory 32, on the display 23 (S25). The processing of S24 is an example of the first determination processing and the processing of S25 is an example of the first error processing.

Figure 10A:
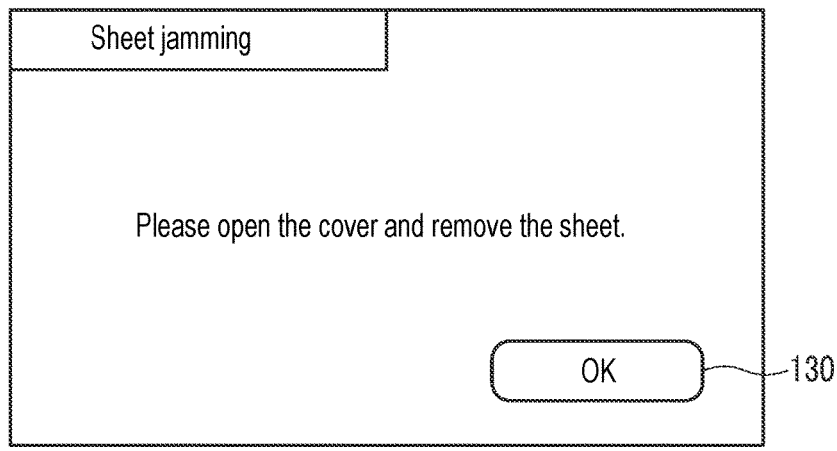
FIGS. 10A and 10B illustrate an error screen corresponding to the error ID "sheet jamming"

Also, the user who sees the standard error screen shown in FIG. 10A removes the sheet jamming on the conveyance path and then taps an [OK] icon 130. Then, in response that the designation of the [OK] icon 130 is received through the input I/F 24, the apparatus program 35 determines that the error has been solved. This is also the same as a case where the standard error screen shown in FIG. 12A or the standard error screen (not shown) for notifying the error 'sheet empty' is displayed.

The server 70 stores XML files shown in FIGS. 3 and 4 in a server memory, for example. In response that a transmission request of the XML file is received from the MFP 10, the server 70 transmits a requested XML file to the MFP 10. The server 70 on the Internet 101 is configured to transmit a file by the HTTP, for example. In the meantime, the XML files shown in FIGS. 3 and 4 may also be stored in the server 80. The server 80 belonging to the wireless LAN 102 is configured to transmit a file by a CIFS (abbreviation of Common Internet File System). In the illustrative embodiment, the server 70 is identified by server identification information "www.server-a.com" and the server 80 is identified by server identification information "server-b".

The XML file shown in FIGS. 3A, 3B, 3C and 3D is an example of the instruction data configuring the expansion program and having a text format. The instruction data is largely classified into a screen instruction XML shown in FIGS. 3A and 3B and an operation instruction XML shown in FIGS. 3C and 3D. The screen instruction XML is an example of the screen instruction data for instructing display of a designation screen on the display 23 of the MFP 10. The operation instruction XML is an example of the operation instruction data and the specific instruction data for instructing an operation including the image processing action. However, the instruction data may also be binary data or binarized text data and may have a CSV format or a unique format designed for the expansion program.

The XML file shown in FIG. 4 is an example of the custom screen data having a text format. The custom screen data is data for representing a custom error screen, which is to be displayed on the display 23 so as to notify an error when the error occurs during execution of the image processing action in accordance with the operation instruction XML received from the server 70. Also, the data format of the custom screen data is not limited to the text format, like the instruction data.

Operations of the system 100 in accordance with the illustrative embodiment are described with reference to FIGS. 5 to 8.

A flowchart of the specification basically indicates processing of the CPU 31, which is to be executed in accordance with commands described in the program. That is, in the below descriptions, processing such as "determination", "extraction", "selection", "calculation", "decision", "specifying", "control" and the like indicates processing of the CPU 31. The processing that is to be executed by the CPU 31 includes hardware control via the OS 34, too. Also, in the specification, the term "data" is represented by a computer-readable bit string. It is assumed that the data having the substantially same meaning and a different format is to be handled as the same data. This also applies to the "information" in the specification.

First, the apparatus program 35 of the MFP 10 displays a service selection screen (not shown) on the display 23 (S11). The service selection screen includes a plurality of service icons. The service icon corresponds to one of the plurality of service records shown in FIG. 2B. Also, the service icon is described with the service name of the corresponding service record. Then, the apparatus program 35 receives a user's operation on the service selection screen through the input I/F 24 (S12).

Then, in response that a designation on the service icon described with the service name "download print" is received through the input I/F 24 (S12: Yes), for example, the apparatus program 35 reads out the URL "http://www.server-a.com/download-print1.xml" of the corresponding service record from the memory 32. Then, the apparatus program 35 acquires an XML file of which a location is indicated by the read URL (S13, S14). The processing of S13 and S14 is an example of the first acquisition processing.

More specifically, the apparatus program 35 transmits XML request information, which requests transmission of an XML file indicated by the file path information "download-print1.xml", to the server 70 identified by the server identification information "www.server-a.com" through the communication I/F 25 (S13). Then, the apparatus program 35 receives the XML file shown in FIG. 3A from the server 70 through the communication I/F 25, as a response to the XML request information (S14).

Then, the apparatus program 35 determines whether the XML file "download-print1.xml" received in S14 is the screen instruction XML or the operation instruction XML (S14). The apparatus program 35 determines which of a <screen> tag and a <command> tag is described in a head of the XML file, for example. In response that the <screen> tag is described in the head of the XML file "download-print1.xml", the apparatus program 35 determines that the XML file is the screen instruction XML (S14: screen instruction). The processing of S14 is an example of the third determination processing.

The screen instruction XML includes a <NextURL> tag, a <title> tag and a <list> tag, for example, as shown in FIG. 3A. For the element of <NextURL> tag, address information indicative of a location of the instruction data, which is to be acquired after an operation instructed by the screen instruction XML is executed, is set. For the element of <title> tag, a character string indicative of a screen title of the instruction screen is set. For the <list> tag, a candidate of an execution condition of a service that is to be implemented by the expansion program is set.

The execution condition is specified by a combination of a plurality of parameters (for example, "operation manual.pdf", "operation report.doc", "fine", "normal" and the like) corresponding to a plurality of items (for example, "data ID", "image quality" and the like). More specifically, for an attribute "key" of the <list> tag, an item ID for identifying an item to be designated by a user through the instruction screen is set. Also, the <list> tag includes a plurality of <option> tags, as elements. For the element of <option> tag, a candidate of a parameter to be designated by a user is set.

Figure 9A:
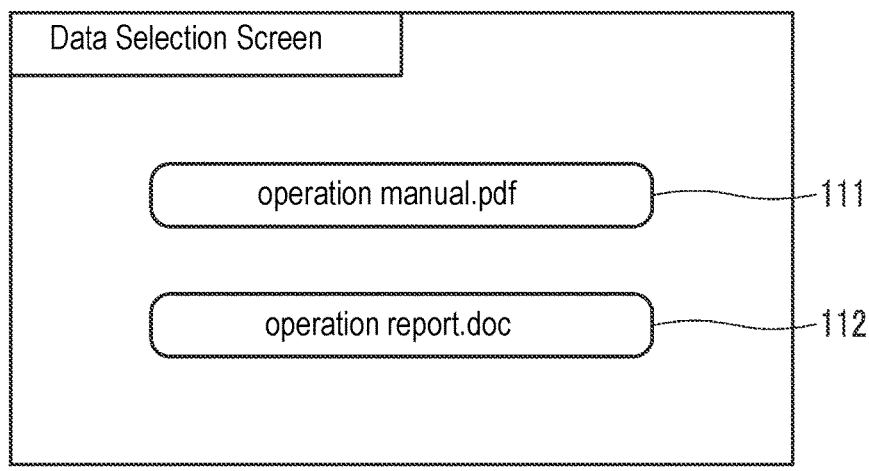
FIGS. 9A and 9B illustrate examples of an instruction screen.

Then, the apparatus program 35 displays a data selection screen shown in FIG. 9A on the display 23 in accordance with the element of <screen> tag of the screen instruction XML "download-print1.xml" received in S14 (S15). Then, the apparatus program 35 receives a user's operation on the data selection screen through the input I/F 24 (S16). The processing of S15 is an example of the display processing and the processing of S16 is an example of the reception processing.

The data selection screen shown in FIG. 9A is a screen for causing the user to designate a parameter corresponding to the item "data ID". The data selection screen includes parameter icons 111, 112 corresponding to the plurality of <option> tags. The parameter icons 111, 112 correspond to image data that can be targets of the print operation. In the illustrative embodiment, the image data stored in the server 70 is set as a target of the print operation. However, the image data stored in the server 80, a storage server (not shown) or a USB memory to be mounted to a mounting unit (not shown) of the MFP 10 may be set as a target of the print operation.

Then, in response that the designation on the parameter icon 111 is received through the input I/F 24 (S16: Yes), for example, the apparatus program 35 temporarily stores a designation parameter "operation manual.pdf" of the item "data ID" in the memory 32. Also, the apparatus program 35 extracts the element of <NextURL> tag "http://www.server-a.com/download-print2.xml" included in the screen instruction XML "download-print1.xml", as the address information of the XML file to be acquired next.

Then, the apparatus program 35 transmits XML request information, which requests transmission of an XML file indicated by the file path information "download-print2.xml" of the extracted address information, to the server 70 identified by the server identification information "www.server-a.com", through the communication I/F 25 (S13). Meanwhile, in S13 after the parameter is designated in S16, the apparatus program 35 transmits XML request information including an item ID and a designation parameter "data ID=operation manual.pdf" through the communication I/F 25.

Then, the apparatus program 35 receives the XML file shown in FIG. 3B from the server 70 through the communication I/F 25, as a response to the XML request information (S14). Also, in response that it is determined that the received XML file "download-print2.xml" is a screen instruction XML (S14: screen instruction), the apparatus program 35 displays an image quality selection screen shown in FIG. 9B on the display 23, in accordance with the XML file (S15).

Figure 9B:
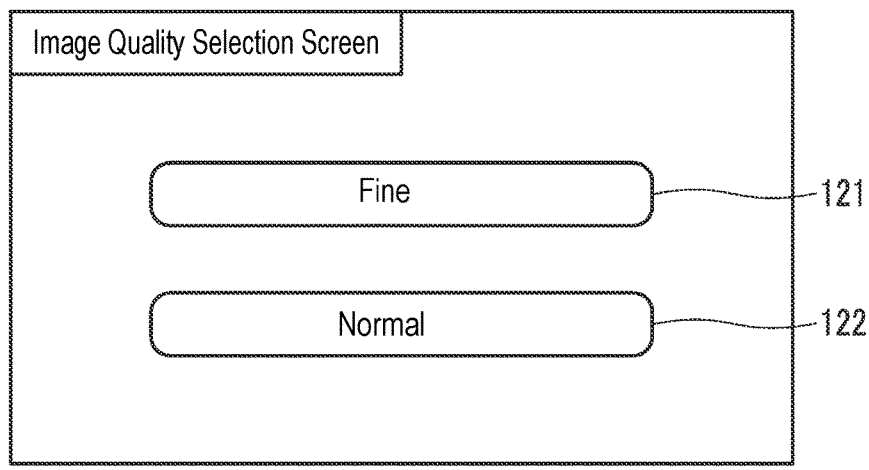

The image quality selection screen shown in FIG. 9B is a screen for causing the user to designate a parameter corresponding to the item "image quality". The image quality selection screen includes parameter icons 121, 122 corresponding to the image qualities "fine" and "normal" of an image, which is to be recorded on the sheet through the print operation. The image quality "fine" is an image quality higher than the image quality "normal".

Then, when a designation on the parameter icon 122 is received through the input I/F 24 (S16: Yes), for example, the apparatus program 35 temporarily stores the designation parameter "normal" of the item "image quality" in the memory 32. Also, the apparatus program 35 extracts the element of <NextURL> tag "http://www.server-a.com/download-print3.xml" included in the screen instruction XML "download-print2.xml", as the address information of the XML file to be acquired next.

Then, the apparatus program 35 transmits XML request information, which requests transmission of an XML file indicated by the file path information "download-print3.xml" of the extracted address information, to the server 70 identified by the server identification information "www.server-a.com", through the communication I/F 25 (S13). Meanwhile, in S13 after the parameter is designated in S16, the apparatus program 35 transmits the XML request information including the item ID and the designation parameters "data ID=operation manual.pdf" and "image quality=normal" through the communication I/F 25.

Then, the apparatus program 35 receives the XML file shown in FIG. 3C from the server 70 through the communication I/F 25, as a response to the XML request information (S14). In response that the <command> tag is described in the head of the XML file shown in FIG. 3C, the apparatus program 35 determines that the XML file is an operation instruction XML (S14: operation instruction). Then, the apparatus program 35 executes instruction operation execution processing of FIG. 6 (S17).

The operation instruction XML includes a <download print> tag and a <ErrorURL> tag, for example, as shown in FIG. 3C. The <download print> tag is information for identifying the service "download print" that is to be used by the MFP 10. A <data> tag, a <a page> tag and a <image quality> tag, which are elements of the <download print> tag, indicate execution conditions of the image processing action (i.e., the print operation) that is to be executed by the MFP 10 so as to implement the download print.

For the element of <data> tag, the parameter "http://www.server-a.com/operation manual.pdf" indicative of a location of image data, which is a target of the print operation, is set. For the element of <image quality> tag, the parameter "normal" indicative of an image quality of an image, which is to be recorded on the sheet through the print operation, is set. The elements of the <data> tag and <image quality> tag correspond to the designation parameters designated in S16. That is, the server 70 sets the parameters included in the XML request information for the elements of <data> tag and <image quality> tag.

When the image data indicated by the element of <data> tag consists of a plurality of pages, a first page number "01", which is a target of the print operation, is set for the element of  tag. For the element of  tag before error notification information (which will be described later) is transmitted, an initial value "01" is set. It is assumed that the image data "operation manual.pdf" consists of five (5) pages, for example.

For the element of <ErrorURL> tag, the address information "http://www.server-a.com/print-error.xml", which indicates a notification destination of an error when the error occurs during execution of the image processing action in accordance with the operation instruction XML, is set. In other words, for the element of <ErrorURL> tag, the address information, which indicates a location of the custom screen data to be acquired when an error occurs during execution of the image processing action.

First, the apparatus program 35 starts the image processing action in accordance with the operation instruction XML received in S14 (S21). The processing of S21 is an example of the execution instruction processing. More specifically, the apparatus program 35 transmits transmission request information, which requests transmission of the image data "operation manual.pdf" indicated by the element of <data> tag, to the server 70 identified by the server identification information "www.server-a.com" through the communication I/F 25. Then, the apparatus program 35 receives the image data "operation manual.pdf" from the server 70 through the communication I/F 25, as a response to the transmission request information.

Then, the apparatus program 35 enables the printer 11 to execute the print operation in accordance with the execution condition indicated by the received operation instruction XML. That is, the printer 11 records the five pages included in the image data "operation manual.pdf" on the sheets with the image quality "normal" in order from the first page. Then, in response that all the pages included in the image data "operation manual.pdf" are recorded on the sheets (S22: No&S23: Yes), the apparatus program 35 ends the instruction operation execution processing and the main processing.

On the other hand, in response that an error occurs during the execution of the image processing action in accordance with the operation instruction XML, which is the specific instruction data (S22: Yes&S24: Yes), the apparatus program 35 executes custom error processing (S26). The custom error processing is processing of notifying the user of a content of the error having occurred during the execution of the image processing action in accordance with the specific instruction data. In the below, custom error processing A, which is executed when an error occurs after the third page of the image data "operation manual.pdf" is recorded on the sheet, is described in detail with reference to FIG. 7A.

First, the apparatus program 35 extracts the element of <ErrorURL> tag "http://www.server-a.com/print-error.xml" included in the operation instruction XML "download-print3.xml", as address information indicative of a location of the custom screen data. Then, the apparatus program 35 executes error screen generation processing (S31). The error screen generation processing is processing of generating a custom error screen. The error screen generation processing is described in detail with reference to FIG. 8.

The apparatus program 35 transmits error notification information to the server 70 identified by the server identification information "www.server-a.com" of the extracted address information, through the communication I/F 25 (S51). The error notification information includes an error ID (for example, "sheet jamming", "sheet empty", "no toner") for identifying the occurred error and progress information indicative of an operation completed before the error occurred. In this example, the progress information includes a page number "03" of the page for which the print operation has been completed. Then, the apparatus program 35 receives custom screen data corresponding to the error ID of the error notification information from the server 70 through the communication I/F 25, as a response to the error notification information (S52: Yes). The processing of S51 is an example of the first transmission processing, and the processing of S52 is an example of the first reception processing.

FIG. 4A illustrates custom screen data corresponding to the error ID "sheet jamming". FIG. 4B illustrates custom screen data corresponding to the error ID "sheet empty". FIG. 4C illustrates custom screen data corresponding to the error ID "no toner". The custom screen data is common, in that it includes the <NextURL> tag, the <error ID> tag and the <generation method> tag, as the elements of the <screen> tag, for example, as shown in FIG. 4.

For the element of <NextURL> tag, address information indicative of a location of the operation instruction XML, which is to be acquired after the error is solved, is set. For the element of <error ID> tag, the error ID included in the error notification information is set. The <generation method> tag is an example of the generation instruction information, which indicates a method of generating the custom error screen. For the element of <generation method> tag, a first value "add", which indicates that the information is to be added to the corresponding standard error screen, or a second value "replace", which indicates that the corresponding standard error screen is to be replaced with a custom error screen to be represented by the custom screen data, is set.

When the custom screen data shown in FIG. 4A is received, the apparatus program 35 determines the setting value of the <generation method> tag (S55). In response that it is determined that the first value "add" is set for the <generation method> tag (S55: add), the apparatus program 35 generates a custom error screen by adding the information, which is to be displayed on the custom error screen, to the standard error screen corresponding to the element of <error ID> tag "sheet jamming" (S56). The processing of S55 is an example of the second determination processing, and the processing of S56 is an example of the first generation processing.

As an example, the custom screen data shown in FIG. 4A includes a <image> tag. For the element of <image> tag, address information indicative of a location of image data, which represents an image (for example, a still image, a moving picture) to be included in the custom error screen, is set. Therefore, the apparatus program 35 receives image data, which is indicated by the file path information "sheet-jam.mov" of the extracted address information, from the server 70 identified by the server identification information "www.server-a.com" through the communication I/F 25.

Figure 10B:
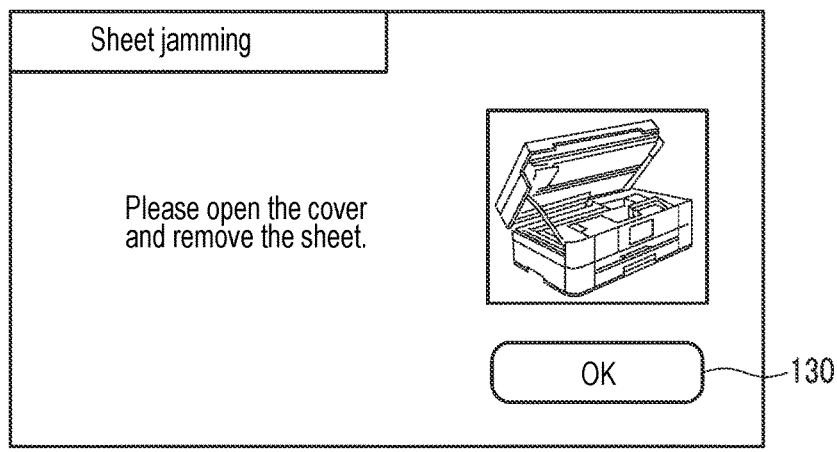

Then, the apparatus program 35 generates a custom error screen shown in FIG. 10B by adding an image represented by the received image data "sheet-jam.mov" to the standard error screen shown in FIG. 10A. A moving picture represented by the image data "sheet-jam.mov" may be an animation, which illustrates a sequence of removing the sheet jamming on the conveyance path of the MFP 10, for example. In the meantime, since the custom screen data shown in FIG. 4A does not include an attribute "language" and a replacement symbol of a <message> tag, which will be described later, the processing of S54 and S59 is skipped.

As another example, the custom screen data shown in FIG. 4B includes a plurality of <message> tags. An attribute "language" of the <message> tag indicates a language (for example, Japanese, English and the like), which is to be mainly used in the MFP 10. For the element of <message> tag, a character string to be included in the custom error screen is set. In response that the plurality of <message> tags having different setting values of the attribute "language" is included (S53: plural), the apparatus program 35 extracts a <message> tag corresponding to an attribute of the MFP 10 (S54). The attribute of the MFP 10 may be stored in advance in the memory 32 upon shipment or may be set by the user, for example. The processing of S54 is an example of the extraction processing.

Also, in response that it is determined that the second value "replace" is set for the <generation method> tag (S55: replace), the apparatus program 35 generates a custom error screen by using only the custom screen data of the standard screen data and custom screen data corresponding to the error ID "sheet empty (S57). That is, the apparatus program 35 generates a custom error screen including the character string of the element of <message> tag extracted in S54. The processing of S57 is an example of the second generation processing.

Figure 11A:
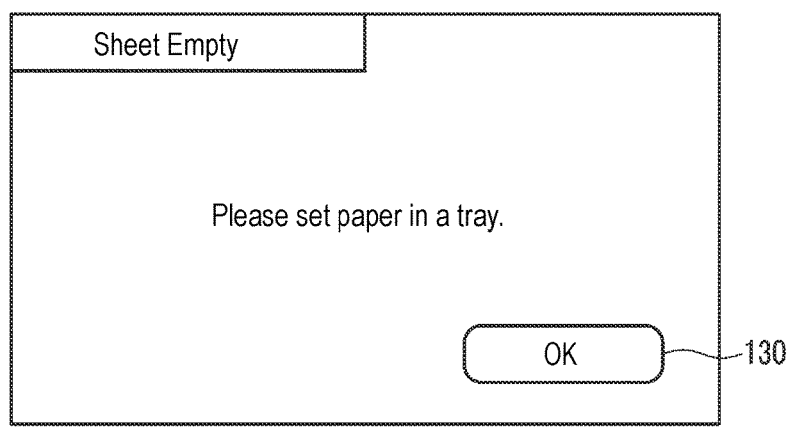
FIGS. 11A and 11B illustrate a custom error screen corresponding to the error ID "sheet empty", FIG. 11A corresponds to an attribute "Japanese", and FIG. 11B corresponds to an attribute "English"
Figure 11B:
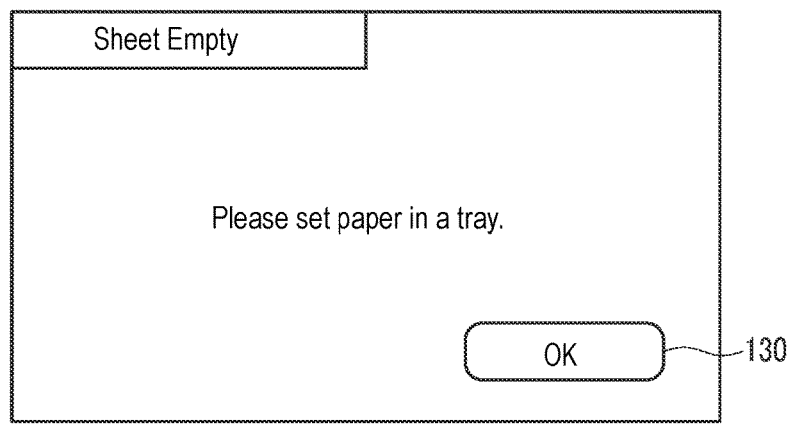

As an example, when the language, which is mainly used in the MFP 10, is Japanese, the apparatus program 35 generates a custom error screen including the element of <message> tag "Please set paper in a tray.", which includes language="Japanese", as shown in FIG. 11A. Although the message is FIG. 11A is written in English, this message will be written in Japanese in the actual apparatus. As another example, when the language, which is mainly used in the MFP 10, is English, the apparatus program 35 generates a custom error screen including the element of <message> tag "Please set paper in a tray", which includes language="English", as shown in FIG. 11B.

As another example, the custom screen data shown in FIG. 4C includes a <message> tag for which a character string including a replacement symbol [% PHONE-NO %] is set as an element. In response that it is determined that the first value "add" is set for the <generation method> tag (S55: add), the apparatus program 35 adds the element of <message> tag "point of contact: [% PHONE-NO %]" to a standard error screen shown in FIG. 12A (S56).

Figure 12B:
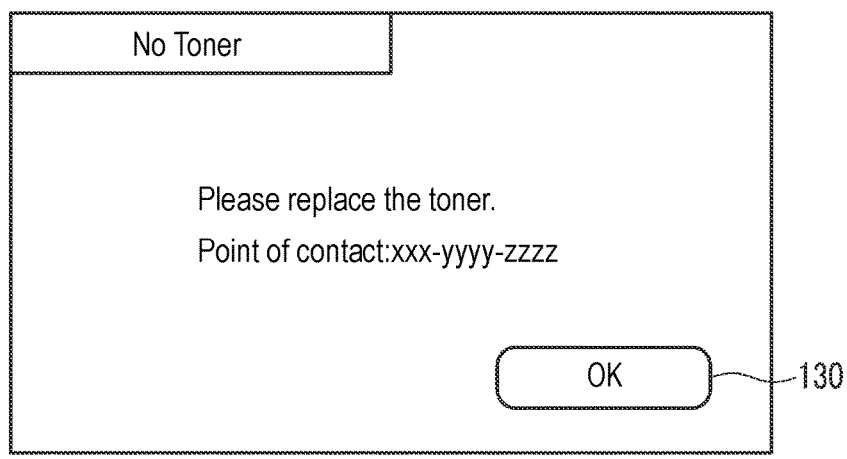

Then, as the custom screen data includes the replacement symbol [% PHONE-NO %] (S58: Yes), the apparatus program 35 reads setting information "xxx-yyyy-zzzz" associated with the replacement symbol [% PHONE-NO %] from the memory 32. Then, the apparatus program 35 generates a custom error screen shown in FIG. 12B by replacing the replacement symbol [% PHONE-NO %] of the standard error screen generated in S56 with the setting information "xxx-yyyy-zzzz" (S59). The processing of S59 is an example of the replacement processing. In the meantime, since the custom screen data shown in FIG. 4C does not include the attribute "language", the processing of S54 is skipped.

Then, returning to FIG. 7A, the apparatus program 35 displays the custom error screen generated in S31 on the display 23 (S32). The processing of S32 is an example of the second error processing. Then, when the designation on the [OK] icon 130 is received through the input I/F 24, the apparatus program 35 determines that the occurred error has been solved (S33: Yes). Then, the apparatus program 35 extracts the element of <NextURL> tag "http://www.server-a.com/download-print4.xml" included in the custom screen data received in S52, as the address information of the operation instruction XML to be acquired next.

The apparatus program 35 transmits XML request information, which requests transmission of an XML file indicated by the file path information "download-print4.xml", to the server 70 identified by the server identification information "www.server-a.com" through the communication I/F 25 (S34). Then, the apparatus program 35 receives the operation instruction XML shown in FIG. 3D from the server 70 through the communication I/F 25, as a response to the XML request information (S35: Yes). The processing of S34 is an example of the second transmission processing, and the processing of S35 is an example of the second reception processing.

The operation instruction XML shown in FIG. 3D is different from that of FIG. 3C, in that a page number "04" is set for the element of  tag and the other points are common to FIG. 3C. That is, the server 70 generates the operation instruction XML shown in FIG. 3D by overwriting the element of  tag of the operation instruction XML shown in FIG. 3C with the page number "04" next to the progress information "03" of the error notification information received from the MFP 10. This  tag is an example of the resumption instruction information, which indicates an operation that is to be executed next to the operation indicated by the progress information. Then, returning to FIG. 6, the apparatus program 35 executes processing of S21 and thereafter by using the operation instruction XML received in S35. That is, the printer 11 records pages of a fourth page and thereafter, which are indicated by the resumption instruction information, of the five pages included in the image data "operation manual.pdf" on the sheets with the image quality "normal".

[Operational Effects of Illustrative Embodiment]

According to the illustrative embodiment, since the acquisition source of the screen data is changed in correspondence to the acquisition source of the instruction data, it is possible to notify the content of the error having occurred during the image processing action through the appropriate error screen. More specifically, when an error occurs during the image processing action executed in accordance with the specific instruction data acquired from the server 70, the custom screen data is acquired from the server 70, so that it is possible to display the customized error screen in conformity to contents of a service, which is provided by the server 70.

Also, according to the illustrative embodiment, it is possible to display the customized error screen in conformity to the attribute of the MFP 10. In the meantime, the "attribute" is not limited to the language, which is mainly used in the MFP 10, and may be a place of destination of the MFP 10 (for example, Japan, US, Europe and the like), a model of the MFP 10, whether or not an option device (for example, whether an additional tray can be mounted, whether a duplex printing is possible), a version of firmware mounted in the MFP 10, and the like, for example.

Also, according to the illustrative embodiment, when the corresponding standard error screen and the custom error screen are similar, it is possible to reduce the information, which is to be defined in the custom screen data, by setting the first value "add" for the <generation method> tag. In the meantime, when it is desired to display a custom error screen totally different from the corresponding standard error screen, it is possible to greatly improve a degree of freedom of the custom error screen by setting the second value "replace" for the <generation method> tag.

Also, according to the illustrative embodiment, it is possible to display an error screen customized for each MFP 10 by replacing the replacement symbol included in the custom screen data with the setting information set by the user of the MFP 10. In the meantime, the customization of the custom screen data by the attribute of the MFP 10, the <generation method> tag and the replacement symbol can be combined by an arbitrary combination.

Also, according to the above configuration, since only the custom screen data corresponding to the content of the occurred error is received, as a response to the error notification information including the error ID, it is possible to reduce a communication load between the MFP 10 and the server 70. However, a reception timing of the custom screen data is not limited to the above example, and may be a timing before the execution of the instruction operation execution processing (S17), such as a tapped timing of the service icon, a reception timing of the operation instruction XML, and the like. This processing is an example of the second acquisition processing. In this case, the apparatus program 35 may be configured to acquire a plurality of custom screen data corresponding to all errors that can occur. Thereby, it is possible to rapidly display the custom error screen after an error has occurred.

Also, according to the illustrative embodiment, the error notification information including the progress information is transmitted and the operation instruction XML including the resumption instruction information is received, so that it is possible to resume the image processing action from an operation next to the operation that has been completed before the error has occurred. Thereby, it is possible to suppress disposables (for example, ink, toner, recording sheet and the like), which are used for the image processing action, from being wasted.

[Modified Embodiments]

Subsequently, custom error processing B, which is a modified embodiment of the custom error processing, is described with reference to FIG. 7B. In the meantime, the detailed descriptions of the common points to the custom error processing A are omitted, and the different points are mainly described.

Meanwhile, in a modified embodiment, the XML file shown in FIG. 3 is stored in the server 70, and the XML file shown in FIG. 4 is stored in the server 80. That is, the instruction data and the custom screen data are stored in the different servers 70, 80. Also, the memory 32 can store therein address information "file://server-b/print-error.xml" indicative of a location of the server 80, which is the error notification destination, as shown in FIG. 2D, for example. The address information shown in FIG. 2D indicates a location of the custom screen data that is to be acquired when an error occurs during the execution of the image processing action.

First, when an error occurs during the execution of the image processing action in accordance with the operation instruction XML (S22: Yes&S24: Yes), the apparatus program 35 temporarily stores the operation instruction XML received in S14 in the memory 32, before the processing of S42 to S44 (S41). Also, when it is determined that the error has been solved (S44: Yes), the apparatus program 35 reads out the operation instruction XML temporarily stored in the memory 32 in S41 (S45). The processing of S41 is an example of the storing processing, and the processing of S45 is an example of the readout processing.

The processing of S42 to S44 is similar to the processing of S31 to S33. However, in S51, the apparatus program 35 transmits the error notification information to the server 80 indicated with the server identification information "server-b" of the address information shown in FIG. 2D, through the communication I/F 25. Also, in S52, the apparatus program 35 receives custom screen data corresponding to an error ID of the error notification information from the server 80 through the communication I/F 25. Then, the apparatus program 35 executes the processing of S21 and thereafter by using the operation instruction XML read in S45.

According to the above modified embodiment, it is possible to resume the image processing action, which is indicated by the operation instruction XML stored in S41, after the error is solved. Also, the custom error processing B can be applied even when the specific instruction data and the custom screen data are stored in the different servers 70, 80. Thereby, it is possible to use the common service, which is provided by the server 70 on the Internet, and to display the custom error screen including information inherent to a structure (for example, a company, a school, a home and the like) to which the wireless LAN 102 belongs, when an error occurs.

Also, in the MFP 10 of the illustrative embodiment, the diverse programs stored in the memory 32 are executed by the CPU 31, so that each processing to be executed by the controller of the disclosure is implemented. However, the configuration of the controller is not limited thereto and the controller may be partially or entirely implemented by hardware such as an integrated circuit.

Also, the disclosure can be implemented not only as the MFP 10 but also as a program for causing the MFP 10 to execute the processing. The program may be provided with being recorded in a non-transitory recording medium. The non-transitory recording medium may include a memory mounted in a server, which can be connected to the MFP 10 through a communication network, in addition to a CD-ROM, a DVD-ROM and the like. The program stored in the memory of the server may be transmitted through the communication network such as the Internet 101, as information or signal representing the program.

What is claimed is:

1. An image processing apparatus comprising:
   am image processing device configured to execute an image processing action;
   a communication interface;
   a memory;
   a display, and
   a controller,
   wherein the controller is configured to execute:
   first acquisition processing of acquiring instruction data,
   execution instruction processing of causing the image processing device to execute the image processing action instructed by the instruction data acquired in the first acquisition processing, and
   first determination processing, in response that an error occurs during the image processing action executed in the execution instruction processing, of determining whether the instruction data acquired in the first acquisition processing is specific instruction data or not, wherein the specific instruction data is data received from a server, as a response to transmission request information transmitted to the server through the communication interface,
   first error processing, in response that it is determined in the first determination processing that the instruction data is not the specific instruction data, of displaying a standard error screen for notifying the error of the image processing action, on the display, wherein the standard error screen is a screen to be represented by standard screen data stored in advance in the memory, and
   second error processing, in response that it is determined in the first determination processing that the instruction data is the specific instruction data, of displaying a custom error screen for notifying the error of the image processing action, on the display, wherein the custom error screen is a screen to be represented by custom screen data acquired from the server.

2. The image processing apparatus according to claim 1,
   wherein the custom screen data represents a plurality of custom error screens each of which is associated with an attribute of the image processing apparatus, and
   wherein the controller is configured to execute:
   extraction processing of extracting the custom error screen, which corresponds to the attribute of the image processing apparatus, of the plurality of custom error screens to be represented by the custom screen data, and
   the second error processing of displaying the custom error screen extracted in the extraction processing, on the display.

3. The image processing apparatus according to claim 1,
   wherein the custom screen data comprises generation instruction information indicative of a method of generating the custom error screen, and
   wherein the controller is configured to execute:
   second determination processing of determining a setting value of the generation instruction information,
   first generation processing, in response that it is determined in the second determination processing that the setting value is a first value, of generating the custom error screen by adding information represented by the custom screen data to the standard error screen, and
   second generation processing, in response that it is determined in the second determination processing that the setting value is a second value, of generating the custom error screen by using only the custom screen data of the standard screen data and the custom screen data, and
   the second error processing of displaying the custom error screen, which is generated in the first generation processing or the second generation processing, on the display.

4. The image processing apparatus according to claim 1,
   wherein the custom screen data comprises a replacement symbol,
   wherein the memory is configured to stores setting information input by a user and the replacement symbol with being associated with each other, and
   wherein the controller is configured to execute:
   replacement processing of replacing the replacement symbol included in the custom screen data with the setting information, which is stored with being associated with the replacement symbol in the memory, and
   the second error processing of displaying the custom error screen, which is represented by the custom screen data of which the replacement symbol has been replaced with the setting information, on the display.

5. The image processing apparatus according to claim 1,
   wherein the controller is configured to execute
   second acquisition processing of acquiring the custom screen data from the server, prior to the execution instruction processing.

6. The image processing apparatus according to claim 1,
   wherein in response that it is determined in the first determination processing that the instruction data is the specific instruction data, the controller executes:
   first transmission processing of transmitting error notification information indicative of a content of the occurred error to the server through the communication interface,
   first reception processing of receiving the custom screen data corresponding to the content of the error indicated by the error notification information from the server through the communication interface, as a response to the error notification information, and the second error processing by using the custom screen data received in the first reception processing.

7. The image processing apparatus according to claim 6, wherein the custom screen data comprises address information indicative of a location of the specific instruction data that is to be acquired after the error is solved, wherein the controller is configured to transmit the error notification information comprising progress information to the server through the communication interface, in the first transmission processing, the progress information indicating an operation that has been completed before the error has occurred during the image processing action indicated by the specific instruction data, and wherein in response that the error notified in the second error processing is solved, the controller executes:

second transmission processing of transmitting the transmission request information, which requests transmission of the specific instruction data indicated by the address information, to the server through the communication interface, second reception processing of receiving the specific instruction data, which comprises resumption instruction information indicative of an operation to be executed next to the operation indicated by the progress information, from the server through the communication interface, as a response to the transmission request information, and the execution instruction processing of causing the image processing device to execute the image processing action, which is indicated by the specific instruction data received in the second reception processing, from the operation indicated by the resumption instruction information.

8. The image processing apparatus according to claim 6, wherein in response that it is determined in the first determination processing that the instruction data is the specific instruction data, the controller executes:

storing processing of storing the specific instruction data acquired in the previous first acquisition processing in the memory, prior to the second error processing, readout processing, in response that the error notified in the second error processing is solved, of reading out the specific instruction data stored in the storing processing from the memory, and the execution instruction processing of causing the image processing device to execute the image processing action indicated by the specific instruction data read out in the readout processing.

9. The image processing apparatus according to claim 1, wherein the image processing apparatus comprises an input interface, wherein the controller is configured to execute:

third determination processing of determining whether the specific instruction data acquired in the first acquisition processing is screen instruction data or operation instruction data, wherein the screen instruction data instructs display of an instruction screen for enabling a user to designate an execution condition of the image processing action and the operation instruction data instructs execution of the image processing action in accordance with the execution condition designated through the instruction screen by the user, and wherein in response that it is determined in the first determination processing that the specific instruction data is the screen instruction data, the controller executes:

display processing of displaying, on the display, the instruction screen instructed by the screen instruction data, reception processing of receiving a user's operation of designating the execution condition instructed by the screen instruction data, through the input interface, and the first acquisition processing of acquiring the next specific instruction data instructed by the screen instruction data, and the execution instruction processing, in response to that it is determined in the first determination processing that the specific instruction data is the operation instruction data, of causing the image processing device to execute the image processing action instructed by the operation instruction data.

10. The image processing apparatus according to claim 1, wherein the memory stores a plurality of standard screen data respectively corresponding to a type of errors, wherein the custom screen data includes error information identified by the type of error, wherein the second error processing of displaying a custom error screen generated by adding information represented by the custom screen data to a corresponding standard error screen, and the corresponding standard error screen is a standard error screen corresponding to the type of the error identified by the error information of the custom screen data acquired from the server.

11. The image processing apparatus according to claim 1, wherein the memory stores a plurality of standard screen data respectively corresponding to a type of errors, wherein the custom screen data includes error information identified by the type of error, wherein the second error processing of displaying a custom error screen instead of a corresponding standard error screen, and the corresponding standard error screen is a standard error screen corresponding to the type of the error identified by the error information of the custom screen data acquired from the server.

12. A method of controlling an image processing apparatus, which includes am image processing device configured to execute an image processing action; a communication interface; a memory; a display, and a controller, the method comprising:

acquiring instruction data, causing the image processing device to execute the image processing action instructed by the instruction data acquired in the acquiring, and determining, in response that an error occurs during the image processing action, whether the instruction data acquired in the acquiring is specific instruction data or not, wherein the specific instruction data is the instruction data received from a server, as a response to transmission request information transmitted to the server through the communication interface, displaying, in response that it is determined that the instruction data is not the specific instruction data, a standard error screen for notifying the error of the image processing action, on the display, wherein the standard error screen is a screen to be represented by standard screen data stored in advance in the memory, and displaying, in response that it is determined that the instruction data is the specific instruction data, a custom error screen for notifying the error of the image processing action, on the display, wherein the custom error screen is a screen to be represented by custom screen data acquired from the server.

* * * * *

UNITED STATES PATENT AND TRADEMARK OFFICE
CERTIFICATE OF CORRECTION

PATENT NO. : 10,225,433 B2
APPLICATION NO. : 15/844937
DATED : March 5, 2019
INVENTOR(S) : Hironori Takasaki Page 1 of 1

It is certified that error appears in the above-identified patent and that said Letters Patent is hereby corrected as shown below:

On the Title Page

Item [73]:
Delete "Nagoha-Shi" and insert -- Nagoya-Shi --, therefor.

In the Claims

Claim 1:
Column 15, Line 32: Delete "am" and insert -- an --, therefor.

Signed and Sealed this
Twenty-eighth Day of May, 2019

Andrei Iancu
*Director of the United States Patent and Trademark Office*